US00RE34433E

United States Patent [19]

Heiligenthal et al.

[11] E Patent Number: Re. 34,433

[45] Reissued Date of Patent: Nov. 9, 1993

[54] CASTER LOCKING MECHANISM AND CARRIAGE

[75] Inventors: Charles H. Heiligenthal, Oak Creek; George R. Slivon; Jack A. Parise, both of Kenosha, all of Wis.

[73] Assignee: Snap-on Tools Corporation, Kenosha, Wis.

[21] Appl. No.: 700,244

[22] Filed: May 15, 1991

Related U.S. Patent Documents

Reissue of:

[64] Patent No.: 4,922,574
Issued: May 8, 1990
Appl. No.: 342,523
Filed: Apr. 24, 1989

[51] Int. Cl.[5] ..... B60B 33/00

[52] U.S. Cl. ..... 16/35 R; 188/1.12; 296/20; 280/79.11

[58] Field of Search ..... 16/35 D, 35 R; 188/1.12, 29; 296/20; 280/79.11

[56] References Cited

U.S. PATENT DOCUMENTS

| | | | |
|---|---|---|---|
| 1,630,514 | 5/1927 | Bayer . | |
| 1,633,638 | 6/1927 | Jarvis et al. . | |
| 1,785,421 | 12/1930 | Nielsen . | |
| 2,110,227 | 3/1938 | Koenigkramer et al. | 16/35 R |
| 2,147,064 | 2/1939 | Schultz, Jr. . | |
| 2,905,275 | 10/1957 | Kostolecki et al. . | |
| 3,286,857 | 11/1966 | King, Jr. et al. . | |
| 3,304,116 | 2/1967 | Stryker | 296/20 |
| 3,534,978 | 10/1970 | Stanfield . | |
| 3,942,608 | 3/1976 | Frank et al. . | |
| 3,997,938 | 12/1976 | Pinaire et al. . | |
| 4,164,355 | 8/1979 | Eaton et al. . | |
| 4,205,413 | 6/1980 | Collignon et al. . | |
| 4,309,791 | 1/1982 | Aulik . | |
| 4,439,879 | 4/1984 | Werner . | |
| 4,706,328 | 11/1987 | Broeske . | |
| 4,720,893 | 1/1988 | Mellwig et al. . | |
| 4,793,445 | 12/1988 | Collingnon et al. . | |

FOREIGN PATENT DOCUMENTS

| | | | |
|---|---|---|---|
| 568165 | 10/1975 | Switzerland . | |
| 2179848 | 3/1987 | United Kingdom | 16/35 R |

*Primary Examiner*—John Sipos
*Assistant Examiner*—Carmine Cuda
*Attorney, Agent, or Firm*—Emrich & Dithmar

[57] ABSTRACT

A wheeled carriage has a chassis with a plurality of swivel casters, and a locking assembly actuated by a foot pedal located along the front of the carriage. Pushing down on the foot pedal rotates a cam that engages a cam follower on a "T" bar frame supporting two locking rings which respectively overlie two of the caster wheels to move the rings into a locking position in engagement with the wheels to lock the wheels and the casters in any position. The cam follower surface includes a ramp portion engageable by the cam for driving the rings to their locking position and a horizontal latch portion engageable by the cam in its "overcenter" position for holding the rings in their locking position. A lifter bar is engageable by the user's foot to rotate the cam back off the follower and permit the rings to resiliently return to their release position. The cam and follower surfaces are so arranged that a limited rotation of the cam through less than about 25 degrees is sufficient to move the assembly between its release and locking configurations so that the locking assembly can be used where only a few inches of clearance beneath the chassis is available.

20 Claims, 3 Drawing Sheets

CASTER LOCKING MECHANISM AND CARRIAGE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to wheeled carriages of the type wherein the wheels are in the form of casters. The invention relates in particular to means for locking the casters so as to prevent rotation of the caster wheels and to prevent swiveling motion in the case of swivel casters.

2. Description of the Prior Art

In caster-wheeled carriages, it is frequently desirable to lock the caster wheels against rotation for holding the carriage in a predetermined location and preventing any accidental movement thereof. It is well known to provide a separate caster brake or lock for each caster wheel. Such brake or lock assemblies are disclosed, for example in U.S. Pat. No. 3,942,608. It is also known to provide locking mechanisms which simultaneously lock more than one caster.

This latter type of caster locking mechanism is disclosed, for example, in U.S. Pat. Nos. 3,304,116 and 4,164,355. This type of assembly provides a locking ring overlying each of several swivel caster wheels substantially coaxially with the caster swivel axis. The locking rings are all interconnected by a locking frame which is moved by means of a cam mechanism between an upper release position wherein the rings are out of contact with the caster wheels to permit free movement thereof and a lowered locking position wherein the rings firmly engage the caster wheels to prevent rotation thereof and also to prevent swiveling thereof. In that prior art device the locking assembly is actuated by a handle member which rotates an eccentric cam through an angle of about 90° between the release and locking configurations. That arrangement is satisfactory where there is a large amount of under-chassis clearance, such as hospital beds or the like, to accommodate the wide-angle rotation, or where the handle assembly can extend beyond the ends of the chassis.

But that prior arrangement is not suitable for use where there is very limited clearance which will not permit a full 90° rotation of the cam member. For example, in carriages with low-slung chassis, such as garage mechanic tool chests, there are only a few inches of clearance between the chassis and the floor. This would make it effectively impossible for a user to exert sufficient leverage to rotate a cam mechanism through a 90° angle. It would be possible to extend a cam shaft beyond an end of the carriage, but this increases the effective floor space occupied by the carriage and also necessitates that the carriage always be utilized in an orientation which maintains access to the end from which the actuator shaft projects.

SUMMARY OF THE INVENTION

It is a general object of the present invention to provide an improved caster locking assembly which avoids the disadvantages of prior locking assemblies while affording additional structural and operating advantages.

An important feature of the present invention is to provide a caster locking assembly which can be disposed beneath the chassis of a wheeled carriage and requires only a few inches of floor clearance for operation thereof.

Still another feature of the invention is to provide a locking assembly of the type set forth which includes a rotatable cam which requires rotation through a range of less than 25° to effect operation thereof between release and locking configurations.

Still another feature of the invention is the provision of a locking assembly of the type set forth, which simultaneously locks plural caster wheels against both wheel rotation and caster swiveling.

Another feature of the invention is the provision of a wheeled carriage having plural swivel casters which are lockable by a locking assembly of the type set forth.

These and other features of the invention are attained by providing, in a caster locking assembly including mounting means adapted to be coupled to an associated load, a caster wheel rotatably carried by the mounting means for rolling engagement with an underlying support surface, and a locking ring resiliently carried by the mounting means and overlying the wheel, the locking ring being movable between a release position out of engagement with the wheel and a locking position firmly frictionally engaging the wheel for locking thereof, the locking ring being resiliently biased toward its release position, the improvement comprising: a cam follower coupled to the locking ring and having a follower surface including an inclined ramp portion, a locking cam carried by the mounting means for rotation about a pivot axis and having a cam surface disposed for camming engagement with the follower surface, and actuator means coupled to the cam for effecting rotation thereof between release and locking conditions, the cam surface being out of engagement with the follower surface when the cam is disposed in its release condition for permitting the locking ring to move to its release position, movement of the cam from its release condition to its locking condition moving the cam surface into camming engagement with the ramp portion of the follower surface for driving the locking ring to its locking position.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 4:
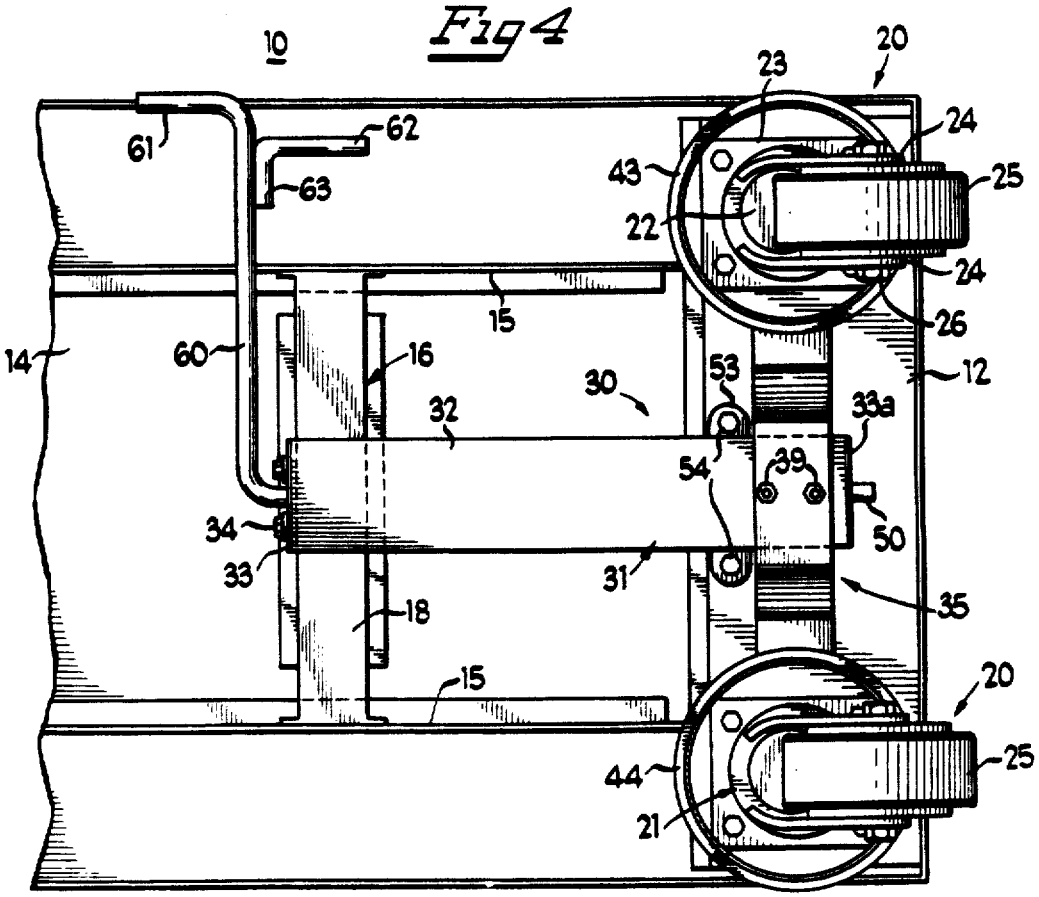
FIG. 4 is an enlarged, fragmentary, bottom plan view of the right-hand end of the carriage of FIG. 1.
Figure 8:
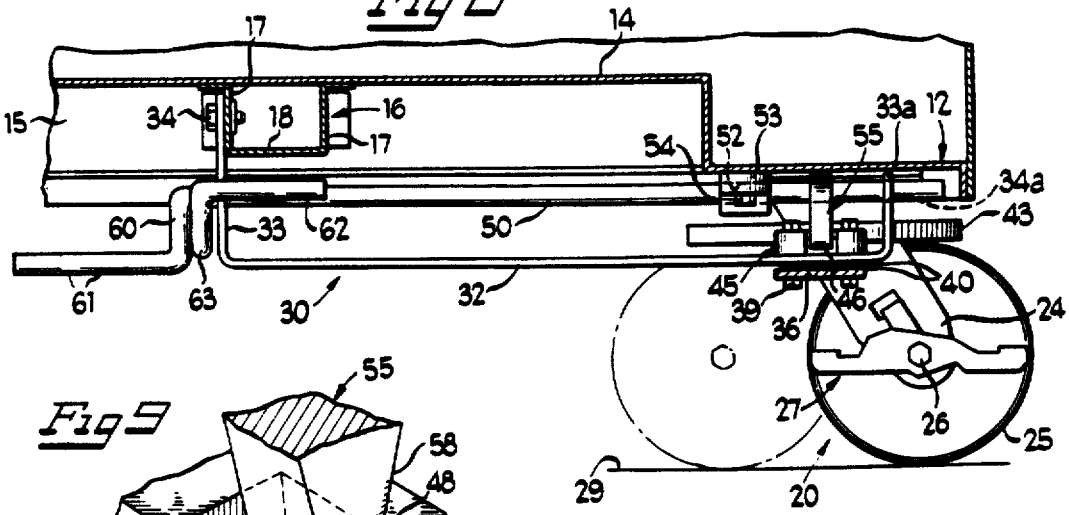
FIG. 8 is an enlarged, fragmentary view in vertical section taken generally along the line 8—8 in FIG. 2, and illustrating the locking assembly in its release configuration.

Referring to FIGS. 1, 2, 4 and 6–8, there is illustrated a wheeled carriage, generally designated by the numeral 10, which includes an elongated, substantially rectangular chassis 11 provided with a bottom wall 12 having a raised central portion 14 (FIGS. 4 and 8). The chassis 11 includes a pair of longitudinally extending angles 15 along either side of the raised central portion 14, the angles 15 being connected intermediate the ends thereof by a transverse channel member 16 which has a pair of parallel vertical side walls 17 interconnected by a bottom wall 18.

Figure 1:
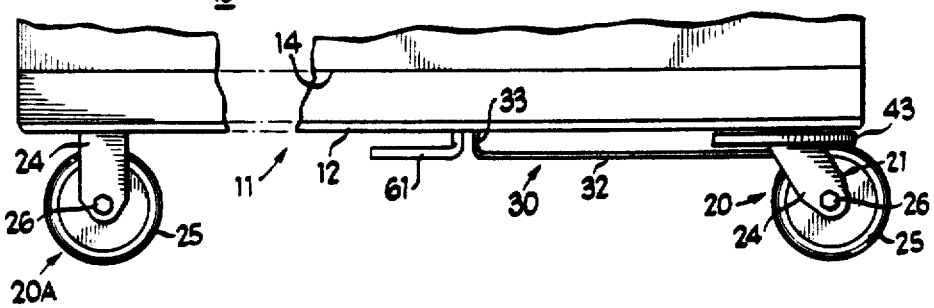
FIG. 1 is a fragmentary, side elevational view of a wheeled carriage incorporating the locking assembly of the present invention, with a portion of the carriage removed.
Figure 2:
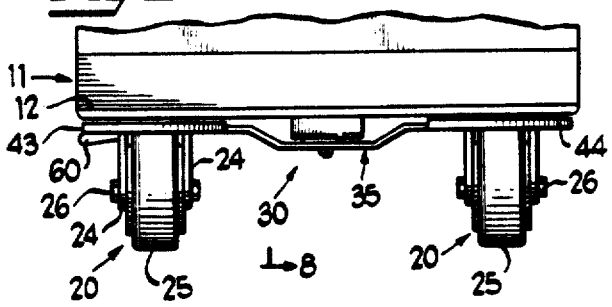
FIG. 2 is a fragmentary end elevational view of the carriage of FIG. 1, as viewed from the right-hand end thereof.
Figure 6:
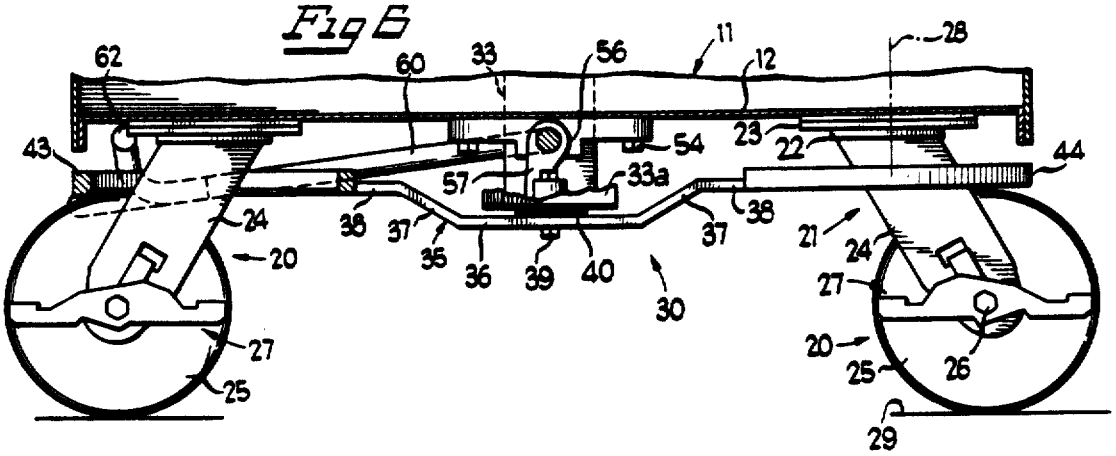
FIG. 6 is an enlarged view, similar to FIG. 2, in partial vertical section, with the locking assembly illustrated in its release configuration and with the casters swiveled 90° from their positions in FIG. 2.
Figure 7:
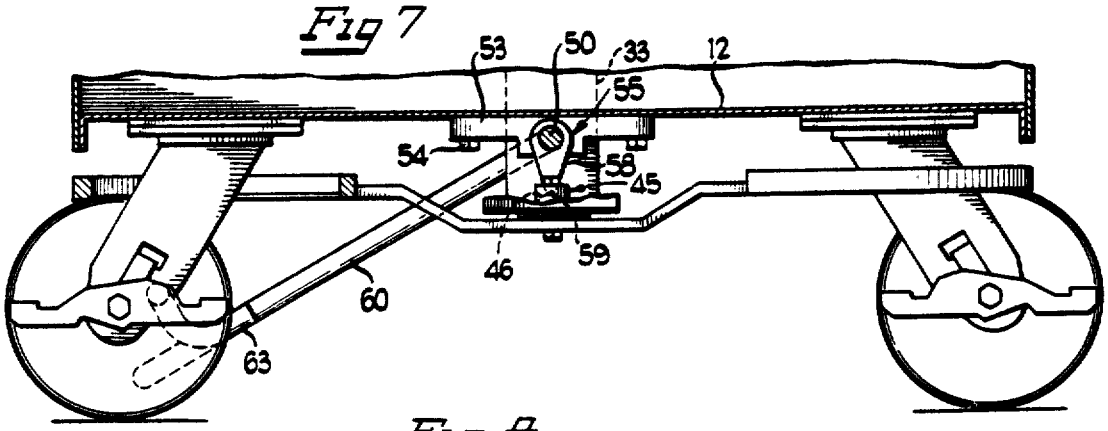
FIG. 7 is a view similar to FIG. 6, illustrating the locking assembly in its locking configuration.

Mounted on the chassis 11, respectively adjacent to the four corners thereof, are four casters, including two swivel casters 20 at one end of the chassis 11 and two fixed casters 20A at the other end of the chassis 11 (FIG. 1). Each of the casters 20 and 20A includes a yoke 21 having a bight portion 22 (FIG. 6) which, in the case of the swivel casters 20, is fixedly secured to a swivel plate 23 mounted on the bottom wall 12 of the chassis 11 for rotation about a swivel axis 28 (FIG. 6). In the case of the fixed casters 20A, the bight 22 is fixedly secured to the bottom wall 12 of the chassis 11. The yoke 21 also includes a pair of legs 24 depending, respectively, from the opposite ends of the bight 22, the legs 24 being substantially vertical in the case of the fixed casters 20A and being inclined to the vertical in the case of the swivel casters 20. Disposed between the legs 24 is a wheel 25 rotatable about a horizontal axle 26, the opposite ends of which are journaled in the legs 24. If desired, any one or more of the casters 20 and 20A may be provided with an individual wheel lock 27 (see FIGS. 6–8), but this is optional. In use, it will be appreciated that the wheels 25 are adapted for rolling engagement with an underlying support surface, such as a floor 29 (FIGS. 6–8), for moving the carriage 10, it being appreciated that steering of the carriage 10 is permitted by the swivel action of the casters 20.

Figure 3:
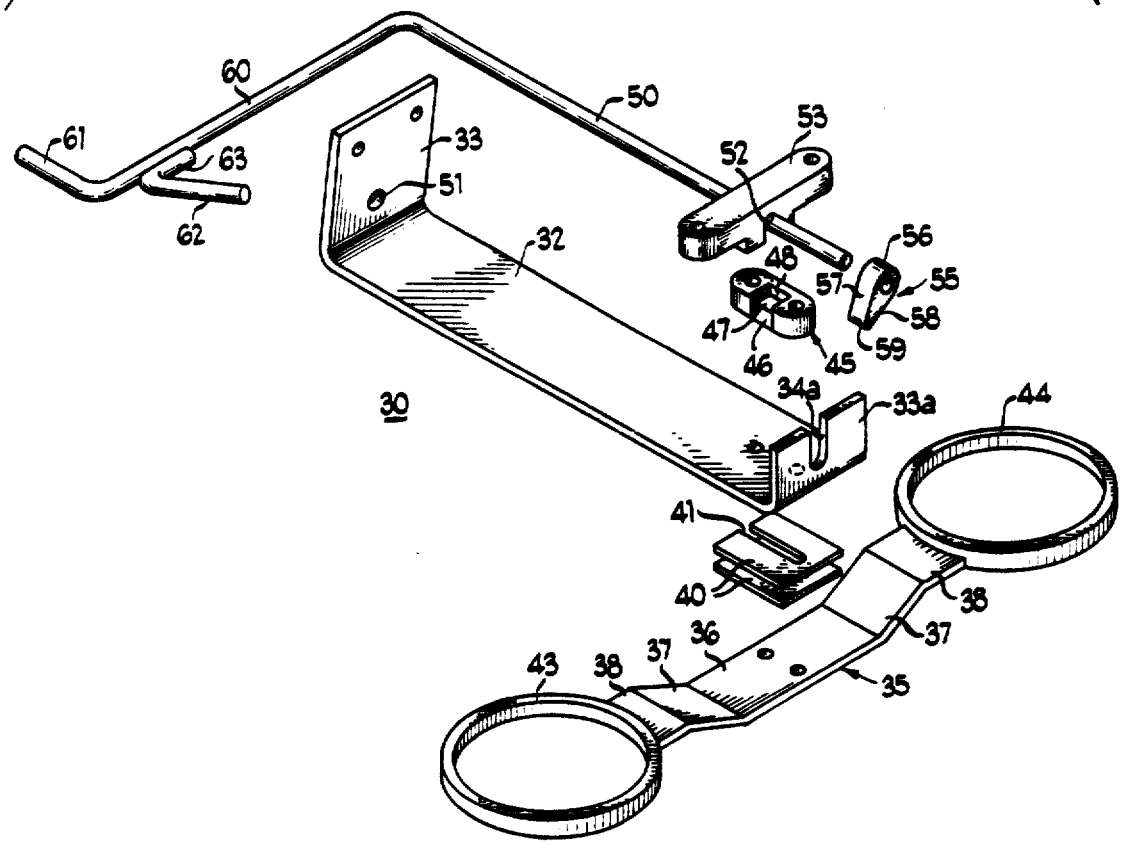
FIG. 3 is an enlarged, perspective, exploded view of the caster locking assembly of FIG. 1.
Figure 5:
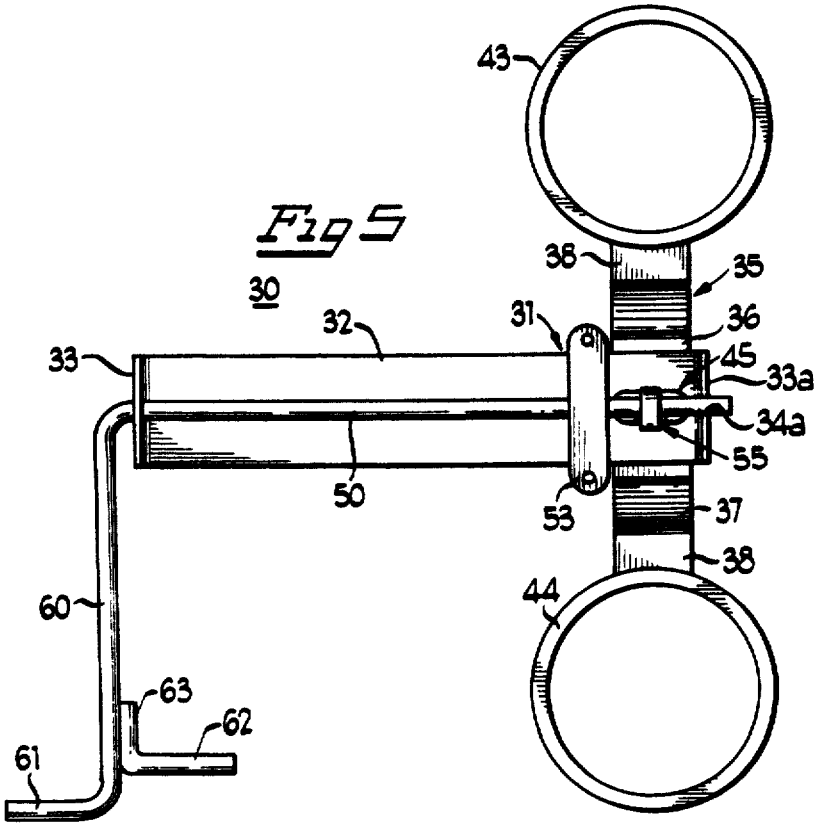
FIG. 5 is a top plan view of the assembled caster locking assembly of FIG. 3, removed from the carriage.
Figure 9:
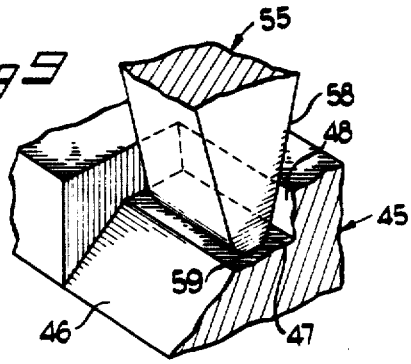
FIG. 9 is a further enlarged, fragmentary, perspective view of the cooperation of the cam and cam follower of the present invention in the locking configuration of the locking assembly.

Referring now also to FIGS. 3, 5 and 9, the carriage 10 includes a caster locking assembly, generally designated by the numeral 30, constructed in accordance with and embodying the features of the present invention. The locking assembly 30 includes a frame 31 in the form of a "T" bar (FIGS. 4 and 5), which includes an elongated bar 32 extending longitudinally of the chassis 11 and provided at one end thereof with an upstanding mounting flange 33 which is fixedly secured to one of the side walls 17 of the channel 16 by suitable fasteners 34 (FIG. 8). Integral with the bar 32 at the other end thereof is an upstanding guide flange 33a, having a guide slot 34a in the upper edge thereof, centrally thereof. The frame 31 also includes a cross bar 35 which extends between the swivel casters 20 substantially normal to the bar 32, and includes a flat central portion 36 integral at its opposite ends, respectively, with a pair of upwardly inclined shoulders 37, which are in turn integral with raised horizontal end portions 38. The central portion 36 is fixedly secured to the distal end of the bar 32 by suitable fasteners 39 (FIG. 4). One or more shims 40 may be disposed between the cross bar 35 and the bar 32 for proper adjustment thereof in a manner to be described more fully below, each of the shims 40 having an elongated longitudinal slot 41 therein to receive the fasteners 39 therethrough. The slots 41 permit the shims 40 to be added or removed by simply loosening the fasteners 39 without disassembly of the frame 31. The end portions 38 of the cross bar 35 are respectively integral with two locking rings 43 and 44, which are respectively disposed above the wheels 25 of the swivel casters 20 in encircling relationship with the yokes 21 and respectively substantially coaxial with the swivel axes 28.

A cam follower 45 is mounted on the upper surface of the bar 32 adjacent to the distal end thereof by means of the fasteners 39. The cam follower 45 is an elongated, generally oval body having an inclined ramp surface 46 formed in one side thereof, the upper end of the ramp surface 46 intersecting a horizontal latch surface 47 which is recessed below the upper surface of the cam follower 45, being spaced therefrom by a vertical stop surface 48 (see FIGS. 3 and 9).

The locking assembly 30 also includes an elongated cam shaft 50 which extends through a complementary bore 51 in the mounting flange 33 of the bar 32 and projects forwardly above the bar 32 through a complementary guide slot 52 in the bottom edge of a mounting block 53, which is fixedly secured to the bottom wall 12 of the chassis 11 by suitable fasteners 54 (FIG. 4), and thence through the guide slot 34a in the guide flange 33a of the bar 32. The shaft 50 is freely rotatable about its axis in the bore 51 and the slots 34a and 52 and has a cam 55 fixedly secured thereto between the guide flange 33a and the mounting block 53. The cam 55 has a part-cylindrical body 56 which is coaxial with the shaft 50, and has projecting therefrom a triangular tip 57 which has a pair of flat side surfaces 58 which converge to a tip surface 59 (FIGS. 3 and 9). The cam 55 is positioned immediately above the cam follower 45 for engagement of one of the side surfaces 58 and the tip surface 59 of the cam 55 with the ramp surface 46 and the latch surface 47 of the cam follower 45, as will be described in greater detail below.

Rotation of the shaft 50 and the cam 55 is effected by means of a crank arm 60 which is unitary with the end of the shaft 50 projecting beyond the attachment flange 33 of bar 32. The crank arm 60 extends substantially perpendicular to the longitudinal axis of the shaft 50 to the front side of the carriage 10, and is provided at its distal end with a pedal portion 61 which is disposed substantially normal to the crank arm 60. The crank arm 60 is also provided with a lifter bar 62 which has an attachment portion 63 fixedly secured to the crank arm 60, as by welding, adjacent to the pedal portion 61, but extending in the opposite direction therefrom. The lifter bar 62 is elevated a predetermined distance over the pedal portion 61.

Preferably, the bar 32 is preloaded, i.e., it is bent so that it is inclined at an angle of slightly less than 90° with the attachment flange 33 and at an angle of slightly greater than 90° with the guide flange 33a. Thus, in its mounted condition, with the flanges 33 and 33A disposed vertically, the bar 32 is normally disposed in a release position (FIGS. 1, 6 and 8) inclined slightly upwardly. Preferably, the bar 32 is formed of a resilient material, such as steel, so as to accommodate deflection downwardly from its normal release position, and to act essentially as a leaf spring inherently biased back to its normal release position. In this normal release position, the locking assembly 30 is disposed in a release configuration, wherein the locking rings 43 and 44 are respectively spaced a slight distance above the caster wheels 25, out of engagement therewith, for accommodating free rotation thereof and free swiveling movement thereof (FIGS. 6 and 8). Adjustment of this release position to obtain the proper clearance between the locking rings 43 and 44 and the wheels 25 can be effected by insertion or removal of shims 40.

The carriage 10 may be any type of carriage, but in the preferred embodiment it is in the form of a mechanics' tool chest of the type utilized by automotive mechanics in automotive garages and the like. In such carriages, there is typically only a four or five-inch clearance between the chassis 11 and the floor 29. In use, the crank arm 60 is so positioned that the pedal portion 61 is disposed adjacent to the front wall of the carriage 10 so that, when the crank arm 60 is in its normal release condition (FIGS. 1 and 2) the pedal portion 61 is spaced slightly below the chassis 11 a distance sufficient for a user to insert his foot to depress the pedal portion 61, thereby rotating the shaft 50 about its axis in a counterclockwise direction, as viewed in FIGS. 6–8. The cam 55 is fixed so that when the crank arm 60 is disposed in its normal release condition, the cam 55 is in the position illustrated in FIGS. 6 and 8, with its inner side surface 58 disposed closely adjacent to, but not necessarily in contact with the inclined ramp surface 46 of the cam follower 45.

When the crank arm 60 is depressed by the user's foot, the side surface 58 of the cam 55 moves into camming engagement with the inclined ramp surface 46 of the cam follower 45, depressing the cam follower 45 and, thereby, the locking frame 31. As the rotation of the cam 55 continues, the tip surface 59 thereof moves into engagement with the ramp surface 46 and cams upwardly along it and then rides up onto the horizontal latch surface 47. At this point, the cam 55 is in an "over-center38 condition, wherein a line extending through the axis of the shaft 50 and the line of contact between the tip surface 59 and the latch surface 47 will be substantially vertical.

In this condition, the locking assembly 30 is in a locking configuration (FIG. 7), wherein the pedal portion 61 is closely adjacent to the floor 29, and wherein the locking rings 43 and 44 have been respectively moved down into firm frictional engagement with the wheels 25 of the swivel casters 20. Further rotation of the cam 55 beyond this locking configuration is prevented by engagement of the side surface 58 of the cam 55 with the stop surface 48 of the cam follower 45 (FIG. 9). It will be appreciated that during depression of the crank arm 60 by the users foot, vertical and lateral movements of the shaft 50 are effectively prevented by the mounting block 53 and the guide flange 33A. It will further be noted that the locking assembly 30 is effective for locking the swivel casters 20 in any swivel position thereof and effectively preventing not only rotation of the wheels 25 about the axles 26, but also preventing swiveling of the casters 20.

Because of the cooperation of the cam 55 and the cam follower 45, it is only necessary to rotate the shaft 50 through a limited angle of substantially less than 45° to effect movement of the locking assembly 30 from its release configuration to its locking configuration. In the preferred embodiment of the invention, it has been found that rotational movement through an angle of about 22° is sufficient. However, even with this limited rotational movement, substantially all of the available clearance between the chassis 11 will be used, so that in the locking configuration of the locking assembly 30, the pedal portion 61 will be disposed very closley adjacent to the floor 29. However, the elevated position of the lifter bar 62 relative to the pedal portion 61 provides sufficient clearance from the floor 29 to permit the user to insert his foot beneath the lifter bar 62 to pivot the crank arm 60 back up to its normal release condition to move the locking assembly 30 back to its release configuration to unlock the casters 20.

In a constructional model of the present invention, the cam follower 45 and the mounting block 53 are formed of suitable low-friction plastic material, such as nylon. The bar 32 and the cam 55 may be formed of steel. The clearance beneath the chassis 11 is 4 or 5 inches and the locking rings 43 and 44 move about one-quarter inch between their release and locking positions. The height of the cam follower 45 is about 0.2 inch and the cam 55 measures about 1.15 inch from its pivot axis to the tip surface 59.

From the foregoing, it can be seen that there has been provided an improved caster locking assembly which provides efficient foot-pedal operation between release and locking configurations for simultaneously locking plural swivel casters by rotation of a cam through a limited angle, so as to be operable where only limited floor clearance is available.

[We claim] *What is claimed is:*

1. In a caster locking assembly including mounting means adapted to be coupled to an associated load, a caster wheel rotatably carried by the mounting means for rolling engagement with an underlying support surface, *the caster having a swivel yoke supporting the caster wheel and carried by the mounting means for rotation about a swivel axis,* and a locking ring resiliently carried by the mounting means *substantially coaxially with the swivel axis* and overlying the wheel, the locking ring lying in a plane and *having a central axis substantially perpendicular to said plane and* being movable between a release position out of engagement with the wheel and a locking position firmly frictionally engaging the wheel for locking thereof, the locking ring being resiliently biased toward its release position, the improvement comprising: a cam follower coupled to the locking ring and having a follower surface including [an inclined] *a planar* ramp portion *inclined with respect to said plane,* a locking cam carried by the mounting means for rotation about a pivot axis inclined with respect to the direction of movement of the locking ring and having a cam surface disposed for camming engagement with said follower surface, and actuator means coupled to said cam for effecting rotation thereof between release and locking conditions, [said cam surface being out of engagement with said follower surface when said cam is disposed in its release condition for permitting the locking ring to move to its release position,] movement of said cam from its release condition to its locking condition moving said cam surface [into] *in* camming engagement with said ramp portion of said follower surface for driving the locking ring to its locking positioni , whereby the locking ring in its locking position effectively prevents swiveling of the caster.

[2. The caster locking assembly of claim 1, wherein the caster includes a swivel yoke supporting the caster wheel and carried by the mounting means for rotation about a swivel axis, the locking ring being disposed substantially coaxially with the swivel axis and, in its locking position, effectively preventing swiveling of the caster.]

3. The caster locking assembly of claim 1, wherein said cam follower includes a latch portion intersecting said ramp portion at the upper end thereof and engageable by said cam surface for holding the locking ring in its locking position.

4. The caster locking assembly of claim 3, wherein said follower surface further includes a stop portion intersecting said latch portion and engageable with said cam surface for limiting the rotational movement of said cam.

5. The caster locking assembly of claim 1, wherein said cam has a part-circularly cylindrical portion coaxial with said pivot axis and a generally triangular prismatic tip portion projecting from said body portion for engagement with said cam follower.

6. The caster locking assembly of claim 3, wherein said actuator means includes a locking shaft carried by the mounting means for rotation about the pivot axis, said cam being carried by said shaft for rotation therewith.

7. The caster locking assembly of claim 6, wherein said actuator means further includes foot pedal means projecting from said locking shaft substantially normal to the pivot axis for access by the foot of a user, said foot pedal means being depressible by the user's foot to rotate said locking cam from its release condition to its locking condition.

8. The caster locking assembly of claim 7, wherein said actuator means further includes a lifter bar projecting laterally from said foot pedal means and elevated a predetermined distance thereabove sufficient so that when said locking cam is disposed in its locking condition there is sufficient clearance beneath said lifter bar for insertion of a user's foot for lifting of said actuator means to rotate said locking cam from its locking condition back to its release condition.

9. In a caster locking assembly including mounting means adapted to be coupled to an associated load, a pair of caster wheels respectively rotatably carried by the mounting means for rolling engagement with an underlying support surface, a locking frame resiliently supported by the mounting means, and a pair of locking rings carried by the locking frame *and lying in a plane* and respectively overlying the wheels *and having substantially parallel central axes substantially perpendicular to said plane*, the locking frame being movable between a release position wherein the locking rings are out of engagement with the wheels and a locking position wherein the locking rings respectively firmly frictionally engage the wheels for locking thereof, the locking frame being resiliently biased toward its release position, the improvement comprising: a cam follower carried by the locking frame and having a follower surface including [an inclined] *a planar* ramp portion *inclined with respect to said plane*, a locking cam carried by the mounting means for rotation about a pivot axis inclined with respect to the direction of movement of the locking rings and having a cam surface disposed for camming engagement with said follower surface, and actuator means coupled to said cam for effecting rotation thereof between release and locking conditions, [said cam surface being out of engagement with said follower surface when said cam is disposed in its release condition for permitting the locking frame to move to its release position,] movement of said cam from its release condition to its locking condition moving said cam surface [into] *in* camming engagement with said ramp portion of said follower surface for driving the locking frame to its locking position.

10. The caster locking assembly of claim 9, wherein the caster includes a swivel yoke supporting the caster wheel and carried by the mounting means for rotation about a swivel axis, the locking ring being disposed substantially coaxially with the swivel axis and, in its locking position, effectively preventing swiveling of the caster.

11. The caster locking assembly of claim 9, wherein said pivot axis substantially bisects a line which interconnects the swivel axes and is substantially perpendicular thereto.

12. The caster locking assembly of claim 9, wherein said follower surface includes a latch portion intersecting said ramp portion at the upper end thereof and engageable by said cam surface for holding the locking frame in its locking position.

13. The caster locking assembly of claim 9, wherein the locking frame is in the form of an elongated resilient metal bar [couple] *coupled* at one end thereof to the mounting means in cantilever fashion and carrying the locking rings and said cam follower adjacent to the other end thereof, said bar being normally disposed in the release position of the locking frame and being resiliently deflectable from that position.

14. In a wheeled carriage including a chassis, a plurality of swivel yokes carried by the chassis for rotation respectively about substantially parallel swivel axes, a plurality of wheels respectively carried by the yokes for rotation about axes disposed substantially perpendicular respectively to the swivel axes, a locking frame resiliently supported by the chassis, and at least two locking rings carried by the locking frame and respectively overlying at least two of the wheels substantially coaxially with the corresponding swivel axes, the locking frame being movable between a release position wherein the locking rings are out of engagement with the associated wheels and a locking position wherein the locking rings firmly frictionally engage the associated wheels for locking thereof, the locking frame being resiliently biased toward its release position, the improvement comprising: a cam follower carried by the locking frame and having a follower surface including [an inclined] *a planar* ramp portion *inclined with respect to a plane which is substantially perpendicular to the swivel axes*, a locking cam carried by the chassis for rotation about a pivot axis inclined with respect to the direction of movement of the locking rings and having a cam surface disposed for camming engagement with said follower surface, and actuator means coupled to said cam for effecting rotation thereof between release and locking conditions, [said cam surface being out of engagement with said follower surface when said cam is disposed in its release condition for permitting the locking frame to move to its release position,] movement of said cam from its release condition to its locking condition moving said cam surface [into] *in* camming engagement with said ramp portion of said follower surface for driving the locking frame to its locking position.

15. The carriage of claim 14, wherein the chassis [i] *is* generally rectangular in shape, the at least two wheels being disposed at one end of the chassis.

16. The carriage of claim 14, wherein said actuator means includes a locking shaft carried by the chassis for rotation about said pivot axis, said cam being carried by said shaft for rotation therewith, foot pedal means projecting from said locking shaft substantially perpendicular to said pivot axis toward the front of the chassis for engagement and depression by the foot of a user to rotate said cam from its release condition to its locking condition.

17. The carriage of claim 16, wherein said actuator means further includes a lifter bar projecting laterally from said foot pedal means and elevated a predetermined distance thereabove sufficient to permit insertion of a user's foot beneath said lifter bar when said cam is disposed in its locking condition for lifting of said actuator means to rotate said cam from its locking condition to its release condition.

18. The carriage of claim 16, wherein the locking frame includes means rotatably supporting said shaft adjacent to one end thereof, and further comprising auxiliary support means carried by the chassis for rotatably supporting said shaft adjacent to the other end thereof.

19. The carriage of claim 18, and further comprising guide means carried by the locking frame and cooperating with said shaft to inhibit lateral movement of the locking frame during operation of said actuator means.

20. The carriage of claim 14, wherein the locking frame is in the form of an elongated resilient metal bar coupled at one end thereof to the chassis in cantilever fashion and carrying the locking rings and said cam follower adjacent to the other end thereof, said bar being normally disposed in the release position of the locking frame and being resiliently deflectable from that position.

21. The carriage of claim 14, wherein said cam rotates through an angle of less than 25 degrees between the release and locking conditions thereof.

* * * * *

UNITED STATES PATENT AND TRADEMARK OFFICE

CERTIFICATE OF CORRECTION

PATENT NO. : Re. 34,433

DATED : November 9, 1993

INVENTOR(S) : Charles H. Heiligenthal et al.

It is certified that error appears in the above-indentified patent and that said Letters Patent is hereby corrected as shown below:

Column 7, line 11, "positioni" should be --position--; and lines 11 and 12, ", whereby the locking ring in its locking position effectively prevents swiveling of the caster" should be in Italics Signed and Sealed this Twenty-second Day of February, 1994

*Attest:*

Bruce Lehman

BRUCE LEHMAN

*Attesting Officer*

*Commissioner of Patents and Trademarks*